US011293790B2

(12) United States Patent
Bogdanov

(10) Patent No.: US 11,293,790 B2
(45) Date of Patent: Apr. 5, 2022

(54) PIEZOELECTRIC TRANSDUCER CONDITION MONITORING

(71) Applicant: Rosemount Inc., Shakopee, MN (US)

(72) Inventor: Vladimir D. Bogdanov, Chelyabinsk (RU)

(73) Assignee: ROSEMOUNT INC., Shakopee, MN (US)

( * ) Notice: Subject to any disclaimer, the term of this patent is extended or adjusted under 35 U.S.C. 154(b) by 101 days.

(21) Appl. No.: 16/652,478

(22) PCT Filed: Sep. 25, 2019

(86) PCT No.: PCT/RU2019/000673
§ 371 (c)(1),
(2) Date: Mar. 31, 2020

(87) PCT Pub. No.: WO2021/061001
PCT Pub. Date: Apr. 1, 2021

(65) Prior Publication Data
US 2021/0231472 A1    Jul. 29, 2021

(51) Int. Cl.
*G01F 1/00* (2006.01)
*G01F 1/32* (2006.01)
(Continued)

(52) U.S. Cl.
CPC ............ *G01F 1/329* (2013.01); *B06B 1/0215* (2013.01); *G01F 25/0007* (2013.01); *B06B 2201/40* (2013.01); *B06B 2201/55* (2013.01)

(58) Field of Classification Search
None
See application file for complete search history.

(56) References Cited

U.S. PATENT DOCUMENTS 4,546,651 A * 10/1985 Merrick .................... G01L 9/12
331/65
5,247,838 A * 9/1993 Vander Heyden .... G01F 1/3263
73/861.22
(Continued)

FOREIGN PATENT DOCUMENTS

JP          2003-329502          11/2003
WO          WO 95/06259          3/1995

OTHER PUBLICATIONS

Notification of Transmtital of the International Search Report and the Written Opinion of the International Searching Authority from PCT/RU2019/000673, dated May 18, 2020.

*Primary Examiner* — Harshad R Patel
(74) *Attorney, Agent, or Firm* — Westman, Champlin & Koehler, P.A.

(57) ABSTRACT

An industrial process field device includes a piezoelectric transducer, a sensor circuit, a test circuit, a controller and a communications circuit. The sensor circuit generates a sensor signal indicating a process variable based on a voltage across the piezoelectric transducer. The test circuit is configured to apply a voltage pulse having a pulse voltage to the piezoelectric transducer that induces a response signal, and capture peak positive and negative voltages of the response signal. The controller calculates a current condition value of the piezoelectric transducer based on the peak positive voltage, the peak negative voltage and the pulse voltage, and generates a diagnostic test result based on a comparison of the current condition value to a reference condition value corresponding to a properly operating piezoelectric transducer. The communications circuit communicates the process variable and the diagnostic test result to an external control unit over a process control loop.

20 Claims, 6 Drawing Sheets

(51) Int. Cl.
*B06B 1/02* (2006.01)
*G01F 25/00* (2022.01)

(56) References Cited

U.S. PATENT DOCUMENTS

| | | | |
|---|---|---|---|
| 5,447,051 A | 9/1995 | Hanks et al. | |
| 5,753,793 A * | 5/1998 | Lindahl | G01P 21/00 |
| | | | 73/1.15 |
| 6,305,232 B1 * | 10/2001 | Ohle | G01F 1/3254 |
| | | | 73/1.16 |
| 6,352,000 B1 * | 3/2002 | Getman | G01F 1/3263 |
| | | | 73/861.22 |
| 6,531,884 B1 | 3/2003 | Kleven | |
| 6,556,028 B1 | 4/2003 | Umanskiy et al. | |
| 7,523,667 B2 * | 4/2009 | Brown | G01F 25/0007 |
| | | | 73/592 |
| 8,387,463 B2 | 3/2013 | Hedtke | |
| 8,844,371 B2 * | 9/2014 | Limacher | G01F 1/3209 |
| | | | 73/861.22 |
| 9,310,412 B2 * | 4/2016 | Arunachalam | G01R 31/58 |
| 2009/0217771 A1 * | 9/2009 | Hoecker | G01F 1/3209 |
| | | | 73/861.22 |
| 2010/0088067 A1 | 4/2010 | Jensen et al. | |
| 2019/0079173 A1 * | 3/2019 | Kutej | G01S 7/52004 |
| 2019/0250200 A1 | 8/2019 | Cada | |

\* cited by examiner

PIEZOELECTRIC TRANSDUCER CONDITION MONITORING

CROSS-REFERENCE TO RELATED APPLICATION

This Application is a Section 371 National Stage Application of International Application No. PCT/RU2019/000673, filed Sep. 25, 2019, not yet published, the contents of which are hereby incorporated by reference in their entirety.

FIELD

Embodiments of the present disclosure relate to industrial process field devices and, more specifically, to monitoring of piezoelectric transducers of an industrial process field device.

BACKGROUND

Industrial process field devices used in industrial process control and monitoring systems typically include a sensing element or transducer that responds to a process variable, and signal conditioning and processing circuitry to convert the sensed variable into a transmitter output that is a function of the sensed process variable. The term "process variable" refers to a physical or chemical state of matter or conversion of energy. Examples of process variables include pressure, temperature, flow, conductivity, PH, and other properties. Process transmitters are typically used to monitor process variables and send measurement values back to a control room in a chemical, petroleum, gas, pharmaceutical, or other fluid processing plant.

One common transducer used in industrial process field devices is a piezoelectric transducer. Piezoelectric transducers may be used to detect an applied force, such as one produced by motion or vibration of an object, to which the piezoelectric transducer is attached. Movement of the object causes the piezoelectric transducer to generate a voltage across terminals of the transducer, the magnitude of which corresponds to the degree of force applied to the transducer. Sensors formed using piezoelectric transducers may be configured to detect industrial process variables such as, for example, fluid flow rates.

Piezoelectric transducers have the potential to malfunction or fail. Such a malfunction could result in faulty process variable measurements. Routine testing of the field device by a skilled technician could potentially assist in detecting a failing piezoelectric transducer of the device, but such testing may require the field device to be removed from service and transported to a testing facility.

SUMMARY

Embodiments of the present disclosure generally relate to industrial process field devices and methods for performing diagnostic testing of piezoelectric transducers. One embodiment of an industrial process field device for sensing a process variable includes a piezoelectric transducer, a sensor circuit, a test circuit, a controller and a communications circuit. The sensor circuit operates the piezoelectric transducer in a sensing mode, and is configured to generate a sensor signal indicating the process variable based on a voltage across the piezoelectric transducer. The test circuit operates the piezoelectric transducer in a testing mode, and is configured to apply a voltage pulse having a pulse voltage to the piezoelectric transducer that deforms the piezoelectric transducer and induces a response signal from the piezoelectric transducer, capture a peak positive voltage of the response signal, and capture a peak negative voltage of the response signal. The controller is configured to calculate a current condition value of the piezoelectric transducer based on the peak positive voltage, the peak negative voltage and the pulse voltage, and generate a diagnostic test result based on a comparison of the current condition value to a reference condition value corresponding to a properly operating piezoelectric transducer. The communications circuit is configured to communicate the process variable and the diagnostic test result to an external control unit over a process control loop.

In one embodiment of the method for testing a condition of a piezoelectric transducer in an industrial process field device, the piezoelectric transducer is operated in a sensing mode using a sensing circuit of the field device including generating a sensor signal indicating a process variable based on a voltage across the piezoelectric transducer. The piezoelectric transducer is operated in a testing mode using a test circuit of the field device including applying a voltage pulse having a pulse voltage to the piezoelectric transducer that deforms the piezoelectric transducer, generating a response signal from the piezoelectric transducer in response to the voltage pulse, capturing a peak positive voltage of the response signal using the test circuit, and capturing a peak negative voltage of the response signal using the test circuit. A diagnostic test result for the piezoelectric transducer is generated using a controller of the field device including calculating a current condition value of the piezoelectric transducer based on the peak positive voltage, the peak negative voltage and the pulse voltage, and generating the diagnostic test result based on a comparison of the current condition value to a reference condition value corresponding to a properly operating piezoelectric transducer. The process variable and the diagnostic test result are communicated to an external control unit over a process control loop using communications circuitry of the field device.

One embodiment of the industrial process field device is in the form of a vortex flowmeter that includes a housing, a vortex shedder and a vortex frequency sensor. The housing has a tubular interior cavity. The vortex shedder is supported by the housing and extends into the tubular interior cavity. The vortex frequency sensor is supported by the housing on a downstream side of the vortex shedder relative to the fluid flow and includes a beam extending from a wall of the tubular interior cavity that is configured to oscillate in response to vortices of the fluid flow shed by the vortex shedder, and a piezoelectric transducer. The vortex flowmeter also includes a sensor circuit, a test circuit, a controller and a communications circuit. The sensor circuit is configured to operate the piezoelectric transducer in a sensing mode, in which the sensor circuit generates a sensor signal indicating a frequency of oscillatory movement of the beam based on a voltage across the piezoelectric transducer. The test circuit is configured to operate the piezoelectric transducer in a testing mode, in which the test circuit applies a voltage pulse having a pulse voltage to the piezoelectric transducer that deforms the piezoelectric transducer and induces a response signal from the piezoelectric transducer, captures a peak positive voltage of the response signal, and captures a peak negative voltage of the response signal. The controller is configured to calculate a flow rate of the fluid flow based on the sensor signal, calculate a current condition value of the piezoelectric transducer based on the peak positive voltage, the peak negative voltage and the pulse voltage, and generate a diagnostic test result based on a comparison of the current condition value to a reference condition value corresponding to a properly operating piezoelectric transducer. The communications circuit is configured to communicate the flow rate and the diagnostic test result to an external control unit over a process control loop.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
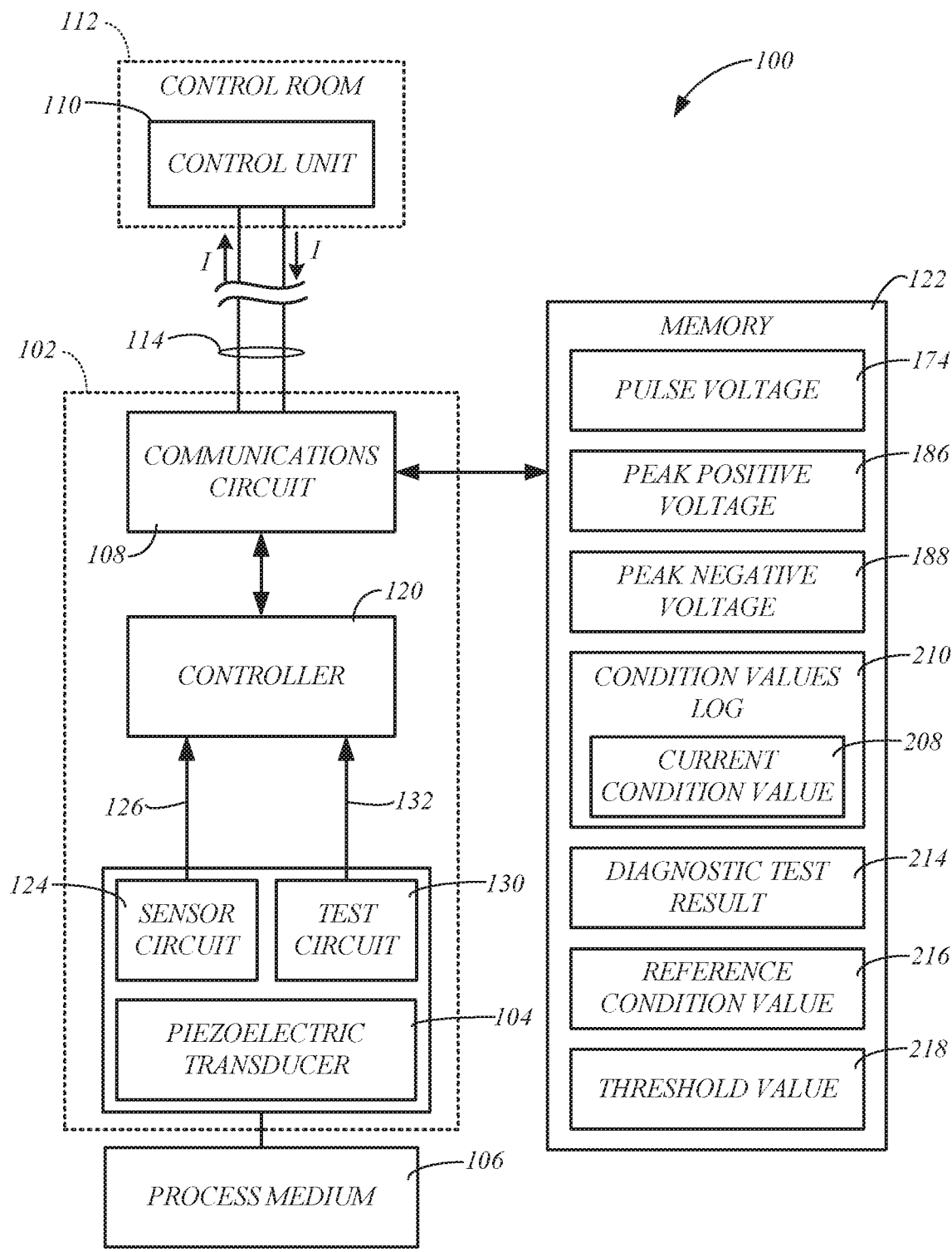
FIG. 1 is a simplified diagram of an exemplary industrial process measurement system, in accordance with embodiments of the present disclosure.

Embodiments of the present disclosure are described more fully hereinafter with reference to the accompanying drawings. Elements that are identified using the same or similar reference characters refer to the same or similar elements. The various embodiments of the present disclosure may be embodied in many different forms and should not be construed as limited to the specific embodiments set forth herein. Rather, these embodiments are provided so that this disclosure will be thorough and complete, and will fully convey the scope of the present disclosure to those skilled in the art.

FIG. 1 is a simplified diagram of an exemplary industrial process measurement system 100, in accordance with embodiments of the present disclosure. The system 100 may be used in the processing of a material (e.g., process medium) to transform the material from a less valuable state into more valuable and useful products, such as petroleum, chemicals, paper, food, etc. For example, the system 100 may be used in an oil refinery that performs industrial processes that can process crude oil into gasoline, fuel oil, and other petrochemicals.

The system 100 includes a field device 102 (e.g., a process transmitter) that utilizes a piezoelectric transducer 104 to sense a process variable, such as a variable relating to a process medium 106. The field device 102 includes communications circuit 108 for communicating with an external computerized control unit 110 over a suitable process control loop. The control unit 110 may be remotely located from the device 102, such as in a control room 112 for the system 100, as shown in FIG. 1.

In some embodiments, the process control loop includes a physical communication link, such as a two-wire control loop 114, or a wireless communication link. Communications between the control unit 110, or another external computing device, and the field device 102 may be performed over the control loop 114 in accordance with conventional analog and/or digital communication protocols. In some embodiments, the two-wire control loop 114 includes a 4-20 milliamp control loop, in which a process variable may be represented by a level of a loop current I flowing through the two-wire control loop 114. Exemplary digital communication protocols include the modulation of digital signals onto the analog current level of the two-wire control loop 114, such as in accordance with the HART® communication standard. Other purely digital techniques may also be employed including FieldBus and Profibus communication protocols.

Exemplary wireless versions of the process control loop include, for example, a wireless mesh network protocol, such as WirelessHART® (IEC 62591) or ISA 100.11a (IEC 62734), or another wireless communication protocol, such as WiFi, LoRa, Sigfox. BLE, or any other suitable protocol.

Power may be supplied to the field device 102 from any suitable power source. For example, the field device 102 may be wholly powered by the current I flowing through the control loop 114. One or more power supplies may also be utilized to power the field device 102, such as an internal or an external battery. An electrical power generator (e.g., solar panel, a wind power generator, etc.) may also be used to power the field device 102, or charge a power supply used by the field device 102.

In some embodiments, the device 102 includes a controller 120, which may represent one or more processors (i.e., microprocessor, microcontroller, central processing unit, etc.) that control components of the device 102 to perform one or more functions described herein in response to the execution of instructions, which may be stored locally in any suitable patent subject matter eligible computer readable media or memory 122 that does not include transitory waves or signals, such as, for example, hard disks, CD-ROMs, optical storage devices, or magnetic storage devices. The processors of the controller 120 may be components of one or more computer-based systems. In some embodiments, the controller 120 includes one or more control circuits, microprocessor-based engine control systems, one or more programmable hardware components, such as a field programmable gate array (FPGA), that are used to control components of the device 102 to perform one or more functions described herein.

The piezoelectric transducer 104 may be used to perform any conventional function relating to industrial process field devices 102, such as a sensing function, in which the piezoelectric transducer 104 is used to sense a process variable relating to an industrial process, such as a process variable associated with a process medium 106. This sensing function may be facilitated using a sensor circuit 124 that operates the piezoelectric transducer 104 in a sensing mode, and generates a sensor signal 126 indicating the process variable based on a signal output from the piezoelectric transducer, such as a voltage across terminals of the piezoelectric transducer. The sensor signal 126 may be processed by the controller 120 and communicated to the control unit 110 or another external computing device using the communications circuit 108.

As discussed above, piezoelectric transducers may degrade and fail, which can result in faulty process variable measurements. In order to detect a degrading or failing piezoelectric transducer, conventional field devices require direct testing of the field device by a technician, which may include transporting the field device to a testing facility. As a result, such periodic testing of the field devices can be costly and lead to significant downtime.

Embodiments of the present disclosure include a test circuit 130 that is used to operate the piezoelectric transducer 104 in a testing mode, in which one or more diagnostic tests may be performed on the piezoelectric transducer 104 to determine whether it is operating properly. The test circuit 130 outputs diagnostic information 132, which may be used by the controller 120 to determine a current condition of the piezoelectric transducer, and generate a diagnostic test result for the piezoelectric transducer 104. The diagnostic test result may indicate whether the piezoelectric transducer 104 is operating properly (e.g., within a normal operating range) or abnormally. The controller may also communicate the diagnostic test result to the control unit 110 or another external computing device using the communications circuit 108 over the process control loop (e.g., physical or wireless communication link).

Figure 2:
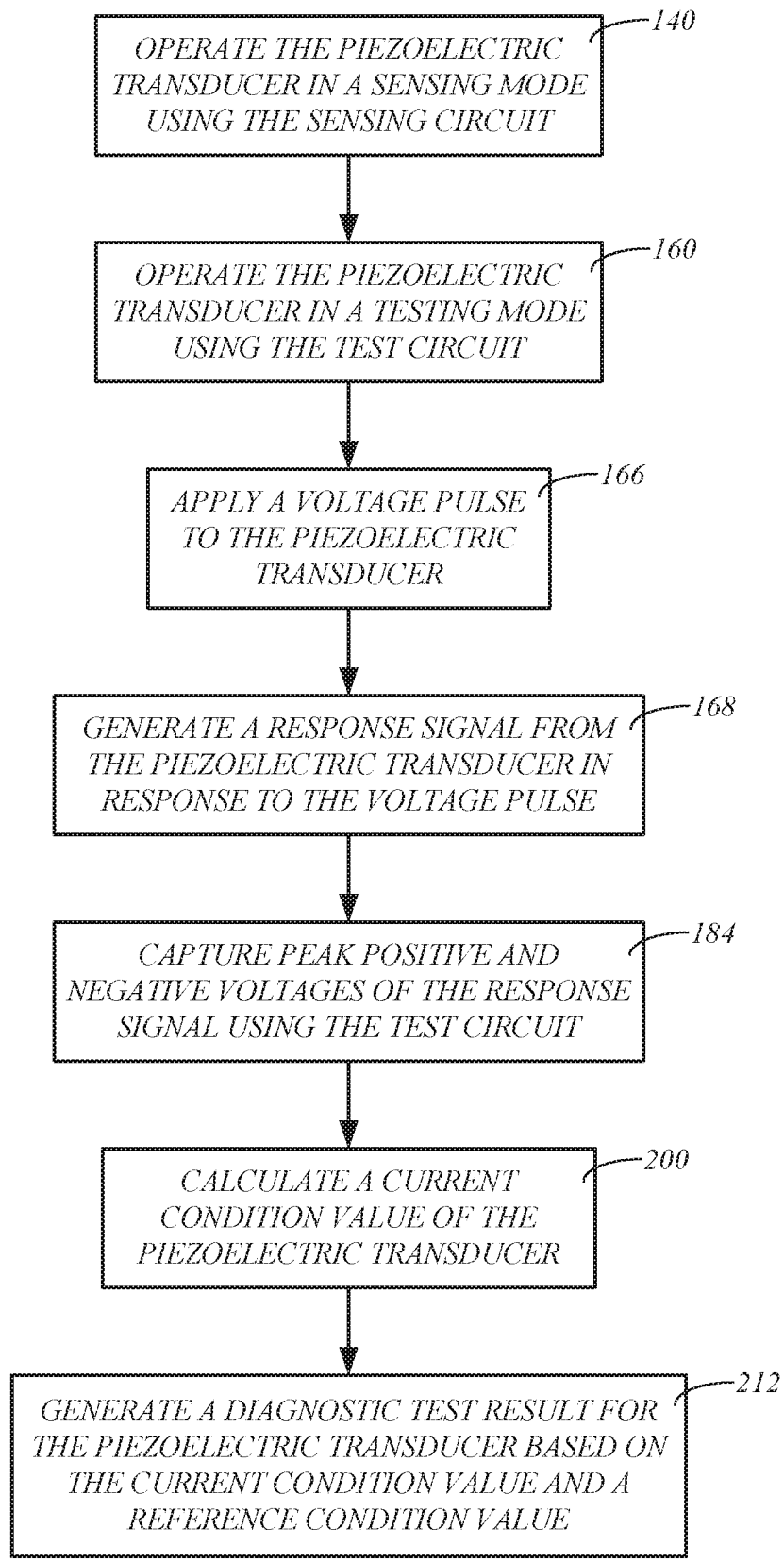
FIG. 2 is a flowchart illustrating an exemplary method for testing a condition of a piezoelectric transducer of an industrial process field device, in accordance with embodiments of the present disclosure.

FIG. 2 is a flowchart illustrating an exemplary method for testing a condition of a piezoelectric transducer 104 of an industrial process field device 102, in accordance with embodiments of the present disclosure. Embodiments of the method may refer to FIGS. 3 and 4, which are simplified diagrams of circuitry comprising an exemplary sensor circuit 124 and an exemplary test circuit 130, with the piezoelectric transducer respectively operating in sensing and testing modes, in accordance with embodiments of the present disclosure.

At 140 of the method, the piezoelectric transducer 104 is operated in a sensing mode (FIG. 3) using the sensor circuit 124 of the field device 102. In one embodiment, this involves generating the sensor signal 126 that indicates the process variable based on a voltage across the piezoelectric transducer 104, such as across terminals 142 and 144 of the piezoelectric transducer 104.

Figure 3:
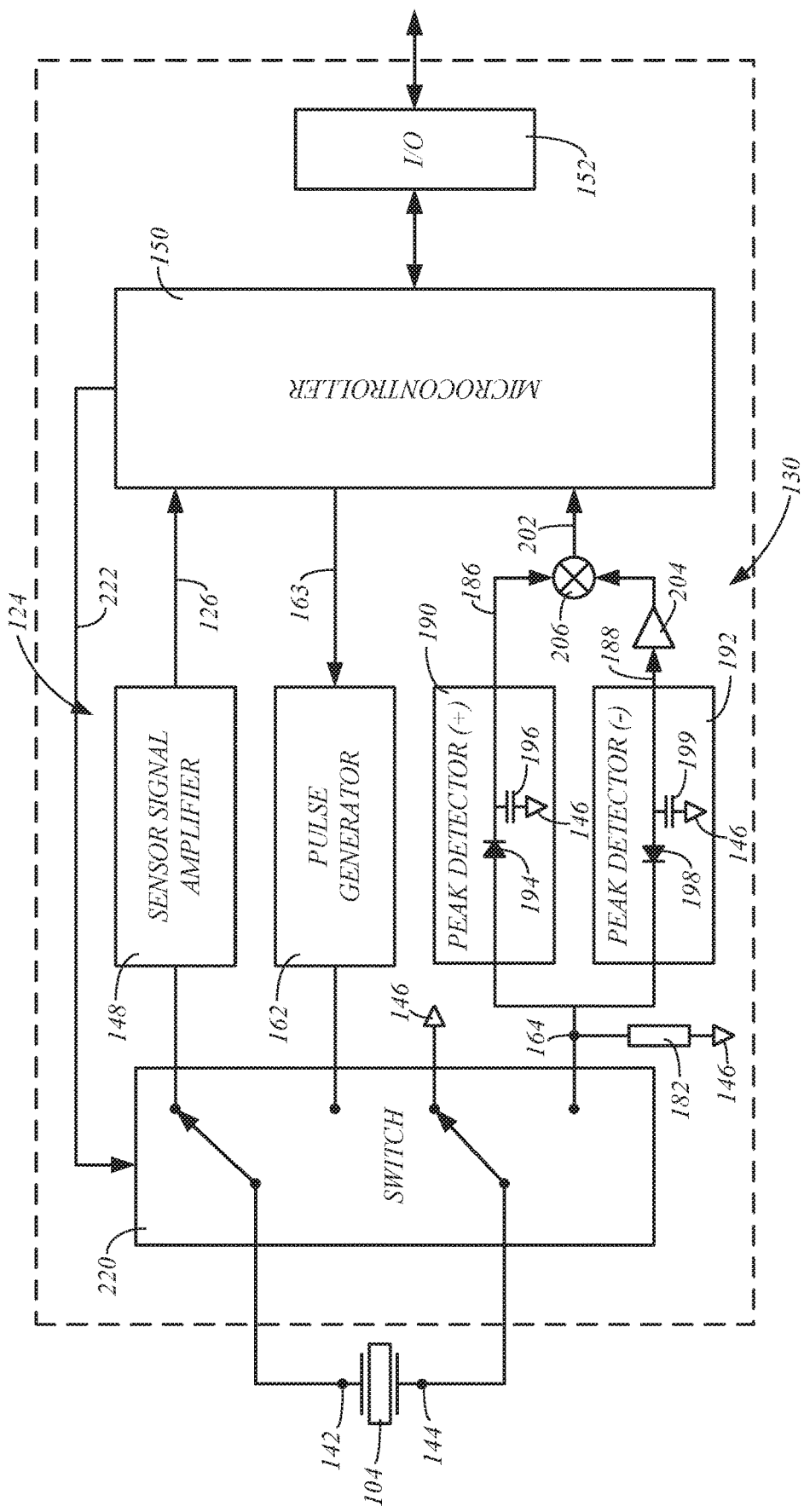
FIGS. 3 and 4 are simplified diagrams of circuitry comprising an exemplary sensor circuit and an exemplary test circuit, with the piezoelectric transducer respectively operating in sensing and testing modes, in accordance with embodiments of the present disclosure.

In some embodiments, when the piezoelectric transducer 104 is operating in the sensor mode, the terminal 144 of the piezoelectric transducer 104 is connected to electrical ground 146, and the terminal 142 is connected to a sensor signal amplifier 148 of the sensor circuit 124, as indicated in FIG. 3. The sensor signal amplifier 148 may be any suitable amplifier for use with piezoelectric transducers to amplify the voltage signal (sensor signal) across the piezoelectric transducer 104 that indicates the sensed process variable. For example, the sensor signal amplifier 148 may include signal amplifying circuits, analog-to-digital converters, and other conventional components for translating the voltage signal across the piezoelectric transducer 104 into a form that may be used by a microcontroller 150 or the controller 120 to discern the process variable measurement. When the microcontroller 150 is separate from the controller 120 of the device 102, the microcontroller 150 may communicate the sensor signal 126, or the value represented thereby, through a suitable input/output component 152, as indicated in FIG. 3. Thus, in one example of operating the piezoelectric transducer 104 or the device 102 in the sensing mode, the piezoelectric transducer 104 generates the sensor signal based on the process variable being detected. The sensor signal may be amplified by the sensor signal amplifier 148 and provided to the microcontroller 150. The microcontroller 150 may perform additional processing of the sensor signal 126, and may communicate the sensor signal 126, or a corresponding value indicated by the sensor signal 126, to the controller 120 of the device 102, as indicated by the sensor signal 126 in FIG. 1. The controller 120 may then communicate the sensor signal 126, or the value indicated by the sensor signal 126, to the control unit 110 or another external computing device.

Figure 4:
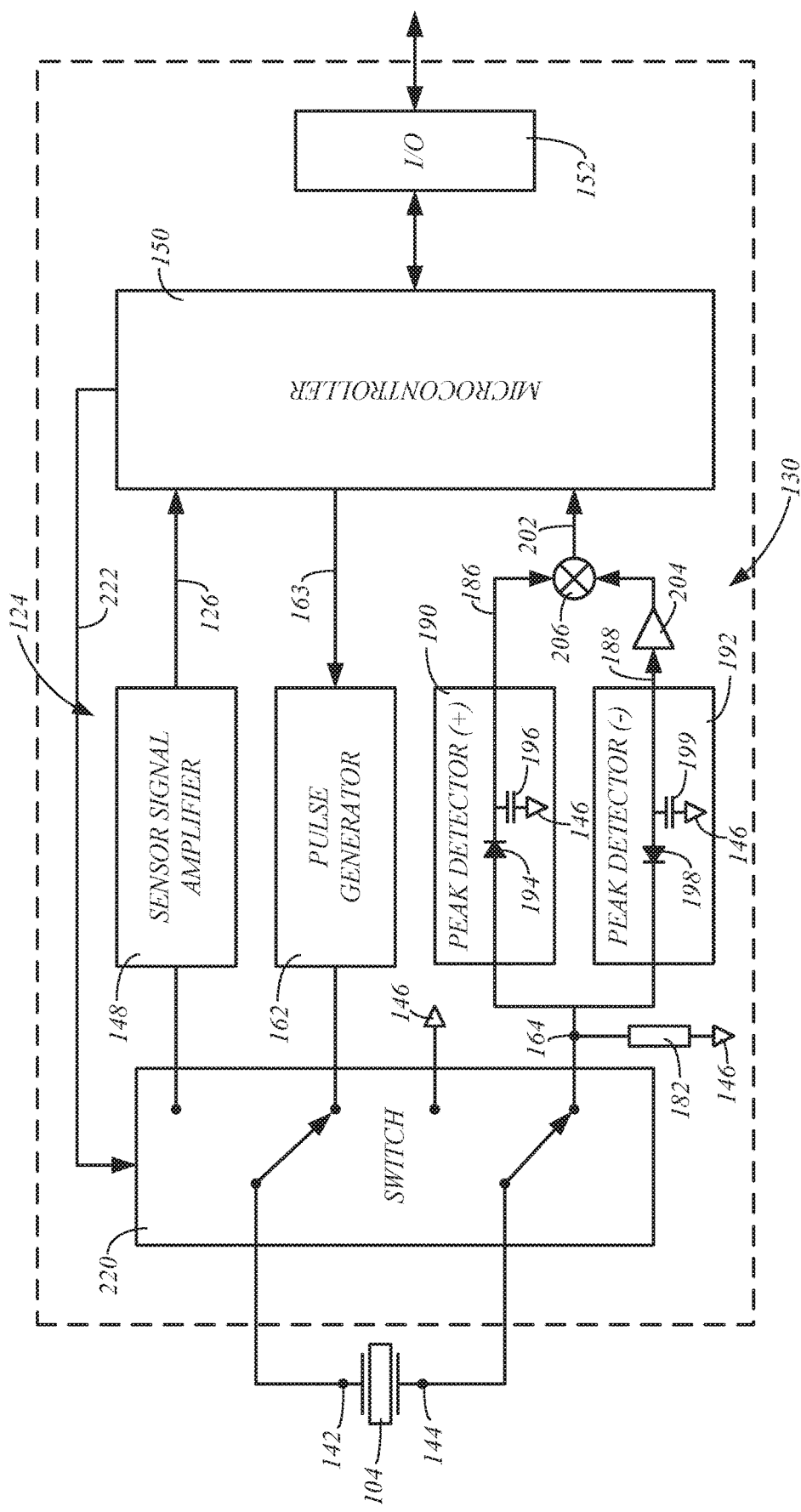

At 160 of the method, the piezoelectric transducer 104 or the device 102 is operated in a testing mode (FIG. 4) using the test circuit 130 of the field device 102. In some embodiments, when the piezoelectric transducer 104 is operated in the testing mode, the terminal 142 of the piezoelectric transducer 104 is coupled to a pulse generator 162 of the test circuit 130, and the terminal 144 is coupled to a node 164 of the test circuit 130, as indicated in FIG. 4.

At 166 of the method, the pulse generator 162 applies a voltage pulse to the piezoelectric transducer 104, such as in response to a signal 163 from the microcontroller 150. The voltage pulse deforms the piezoelectric transducer 104 and causes the piezoelectric transducer 104 to generate a response signal, at 168 of the method.

Figure 5:
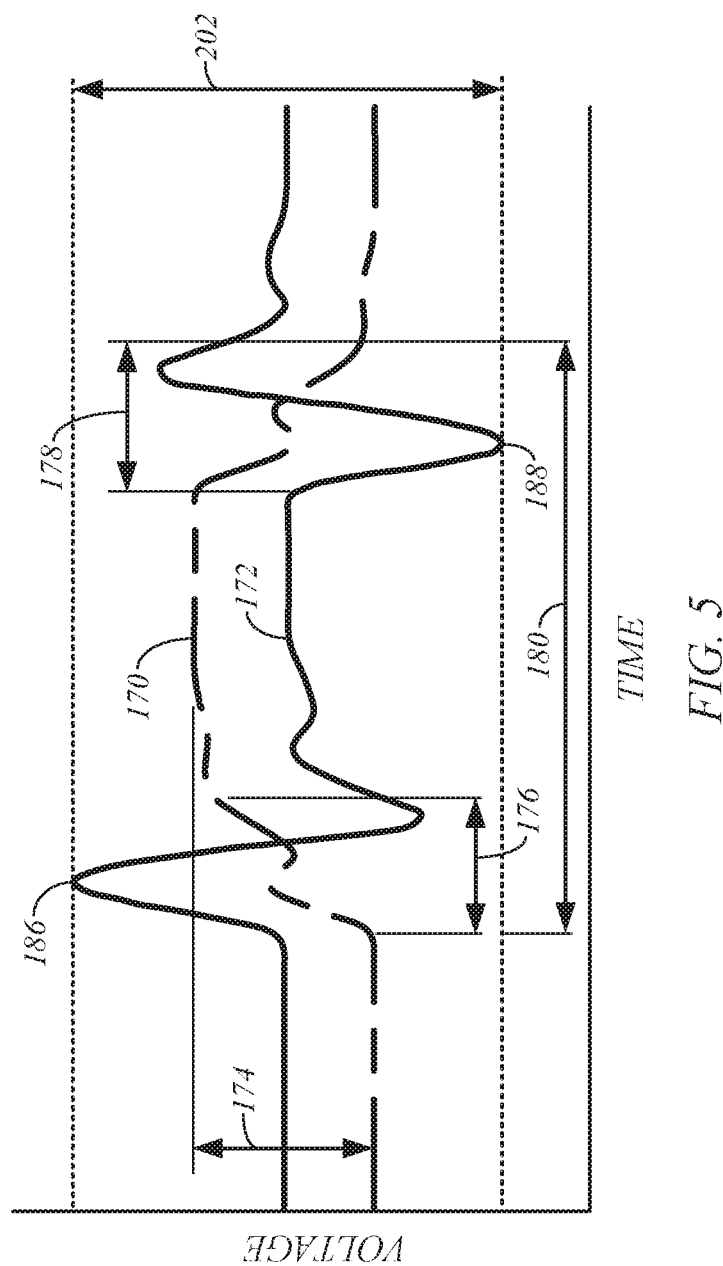
FIG. 5 is a chart of voltage over time illustrating an exemplary voltage pulse and a corresponding response signal from a piezoelectric transducer, in accordance with embodiments of the present disclosure.

FIG. 5 is a chart of voltage over time illustrating an exemplary voltage pulse 170 and a corresponding response signal 172 from the piezoelectric transducer 104, in accordance with embodiments of the present disclosure. The voltage pulse 170 includes a pulse voltage 174, a rise time 176, a fall time 178 and a pulse duration 180.

The response signal 172 generated by the piezoelectric transducer 104 may be measured using any suitable technique. In some embodiments, a current from the piezoelectric transducer 104 is delivered through a reference resistance, and the measured response signal 172 corresponds to a voltage generated across the reference resistance 182 in response to the current. In one example, the test circuit 130 includes a reference resistance 182 (FIG. 4) that is connected between the node 164 and electrical ground 146. Thus, the response signal 172 corresponds to a voltage across the reference resistance 182, such as the voltage at node 164 of the test circuit 130.

At 184 of the method, a peak positive voltage 186 and a peak negative voltage 188 (FIG. 5) of the response signal 172 are captured using the test circuit 130. In some embodiments, the peak positive voltage 186 of the response signal 172 is sampled during the rise time 176 of the voltage pulse 170, and the peak negative voltage 188 of the response signal 172 is sampled during the fall time 178 of the voltage pulse 170, as indicated in FIG. 5.

The test circuit 130 may include a peak positive voltage detector 190 and a peak negative voltage detector 192 that are each coupled to the node 164 of the test circuit 130. For example, the peak positive voltage detector 190 may include a diode 194, and a capacitor 196 that is coupled to electrical ground 146 and captures the peak positive voltage 186 of the response signal 172. Likewise, the peak negative voltage detector 192 may include a diode 198 and a capacitor 199 that is attached to electrical ground 146 and captures the peak negative voltage 188 of the response signal 172 at the node 164.

In some embodiments, the test circuit 130 may include components of the sensor circuit 124. For example, the test circuit 130 may use the sensor signal amplifier 148 or components thereof (e.g., an analog-to-digital converter), to form the detectors 190 and 192 and capture the peak positive and negative voltages 186, 188, for example.

At 200 of the method, a current condition value of the piezoelectric transducer 104 is calculated using the controller 120 of the device 102. In some embodiments, the current condition value of the piezoelectric transducer 104 is calculated based on the peak positive voltage 186, the peak negative voltage 188 and the pulse voltage 174. The controller 120 may store the detected peak positive voltage 186 and peak negative voltage 188 in the memory 122, as indicated in FIG. 1. The pulse voltage 174 may be predefined and stored in the memory 122.

In some embodiments, the controller 120 calculates the current condition value of the piezoelectric transducer 104 based on a ratio of the sum of the absolute values of the peak positive voltage 186 and the peak negative voltage 188 (voltage 202 in FIG. 5) and the pulse voltage 174. For example, in one embodiment, the current condition value is calculated based on the pulse voltage 174 divided by the absolute value of the sum of the peak positive voltage 186 and the peak negative voltage 188 or voltage 202. Thus, when the pulse voltage is 10,000 millivolts and the sum of the absolute values of the peak positive and negative voltages is 739 millivolts, the current condition value may be calculated as 10,000/739 or 13.53.

In some embodiments, the test circuit 130 includes an inverter 204 and an adder 206. The inverter 204 is coupled to the output of the peak negative voltage detector 192 that operates to invert the peak negative voltage 188 detected by the detector 192. The adder 206 is coupled to the output of the peak positive voltage detector 190 and the output from the inverter 204. Thus, the adder outputs the sum (202) of the peak positive voltage 186 and the absolute value of the peak negative voltage 188 to the microcontroller 150, as indicated in FIG. 4. The test circuit 130 may also include analog-to-digital converters and other components that are used to process signals from the detectors 190, 192, the inverter 204, and/or the adder 206 before presenting the voltage sum 202 to the microcontroller 150.

The microcontroller 150 may be used to determine a value of the voltage sum 202 and output the value to the controller 120 of the device 102 through the input/output component 152. The controller 120 may then calculate the current condition value based on the ratio of the pulse voltage 174 to the voltage sum 202. The calculated current condition value may be stored in the memory 122, as indicated at 208, and may be an entry in a condition values log 210, for example.

The condition values log 210 may also include previously calculated current condition values for the piezoelectric transducer 104. Trends in the condition of the piezoelectric transducer 104 can be monitored using the condition values stored in the log 210, and used to provide additional diagnostic analysis of the transducer 104.

At 212 of the method, the controller 120 generates a diagnostic test result 214 for the piezoelectric transducer 104, which may be stored in the memory 122, based on the current condition value and a reference condition value 216, which may also be stored in the memory 122, as indicated in FIG. 1. The reference condition value 216 may be calculated in the same or similar manner as the current condition value, and corresponds to a condition value of the piezoelectric transducer when it is operating properly. The reference condition value 216 may be based upon empirical studies of one or more piezoelectric transducers that are similar to the piezoelectric transducer 104 of the device 102, or one or more empirical studies of the piezoelectric transducer 104 taken at the time of manufacture of the piezoelectric transducer 104 or the device 102.

In some embodiments of step 212 of the method, the diagnostic test result 214 is generated based on a comparison of a difference between the calculated current condition value 208 and the reference condition value 216 to a threshold value 218, which may be retrieved by the controller 120 from the memory 122 of the device 102, as indicated in FIG. 1. In some embodiments, the diagnostic test result 214 indicates that the condition of the piezoelectric transducer 104 is abnormal when the difference exceeds the threshold value 218.

The method may also include a step of communicating information to the control unit 110 or another external computing device using the communications circuit 108. The information may include, for example, the detected process variable value indicated by the sensor signal 126, the diagnostic test result 214, and/or other information.

In some embodiments, the device 102 includes a switch 220 (FIGS. 3 and 4) for transitioning the device 102 between the sensing and testing modes, such as in response to a signal 222 from the microcontroller 150. In some embodiments, the switch 220 is configured to couple the terminal 142 of the piezoelectric transducer 104 to the sensor circuit 124 (e.g., sensor signal amplifier 148), and couple the terminal 144 of the piezoelectric transducer 104 to electrical ground 146, when in the sensing mode, as shown in FIG. 3. Thus, in some embodiments, the switch 220 disconnects the piezoelectric transducer 104 from the test circuit 130 when in the sensing mode. Additionally, the switch 220 is configured to couple the terminal 142 of the piezoelectric transducer 104 to the test circuit 130 (e.g., the pulse generator 162), and couple the terminal 144 of the piezoelectric transducer 104 to the node 164, the reference resistance 182, the peak positive voltage detector 190 and the peak negative voltage detector 192, when in the testing mode, as shown in FIG. 4. Thus, in some embodiments, the switch 220 disconnects the piezoelectric transducer 104 from the sensor circuit 124 when in the testing mode.

Figure 6:
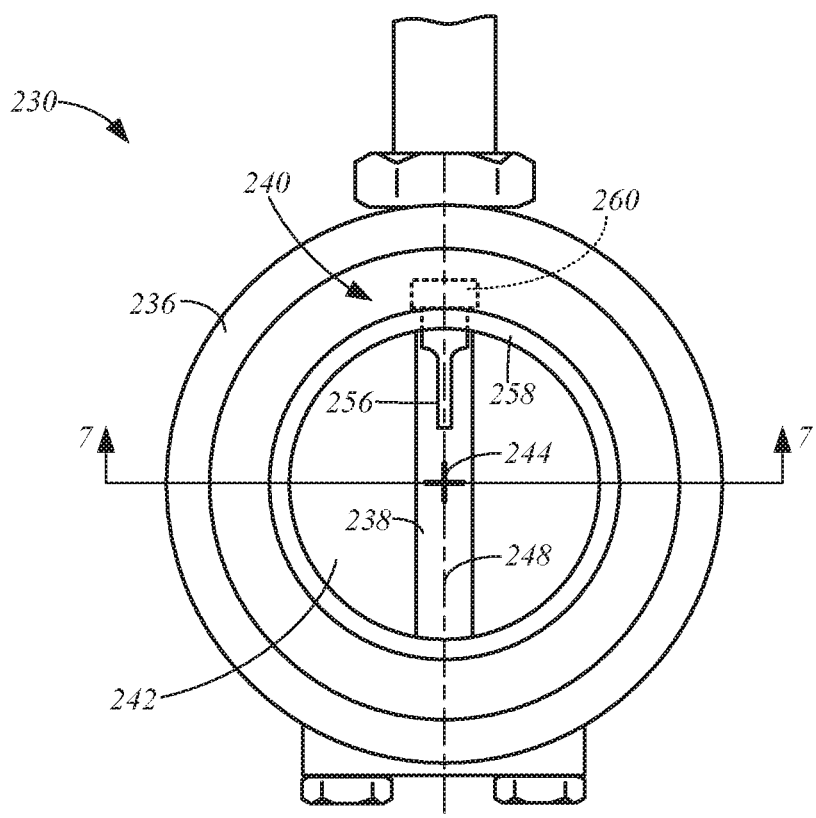
FIG. 6 is a simplified front view of an exemplary vortex flowmeter, in accordance with embodiments of the present disclosure.
Figure 7:
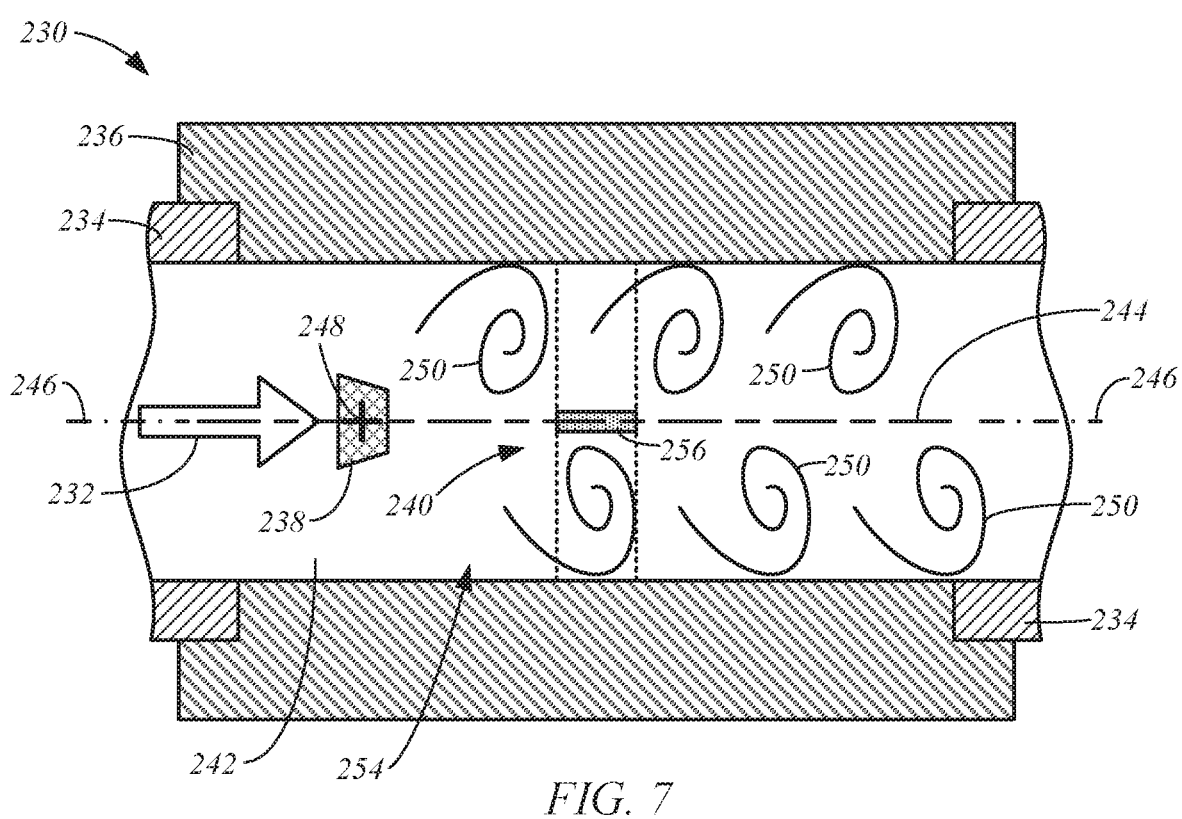
FIG. 7 is a top cross-sectional view of the vortex flowmeter of FIG. 6 taken generally along line 7-7, in accordance with embodiments of the present disclosure.

One exemplary industrial process field device that uses a piezoelectric sensor to detect or measure a process variable is a vortex flow meter, an example of which is illustrated in FIGS. 6 and 7. FIG. 6 is a simplified front view of an exemplary vortex flowmeter 230, and FIG. 7 is a top cross-sectional view of the vortex flowmeter 230 of FIG. 6 taken generally along line 7-7, in accordance with embodiments of the present disclosure.

The vortex flowmeter 230 includes a piezoelectric transducer for detecting a flow rate of a process medium fluid flow 232 (FIG. 7) traveling through a process vessel 234, such as a pipe, for example. Some embodiments of the vortex flowmeter 230 include a housing 236, a vortex shedder 238 and a vortex frequency sensor 240. The housing 236 includes an interior cavity 242, such as a tubular interior cavity having a central axis 244. The housing 236 may be connected in line with the pipe 234, such that the central axis 244 is substantially coaxial to a central axis 246 of the pipe 234, as shown in FIG. 7.

The vortex shedder 238 is supported by the housing 236 and extends into the tubular interior cavity 242 along an axis 248 that is oblique to the central axis 244. In some embodiments, the vortex shedder 238 has a conventional cross-sectional shape that is configured to shed vortices 250 in response to the fluid flow 232, as indicated in FIG. 7. In one exemplary embodiment, the vortex shedder 238 has a trapezoidal cross-sectional shape, as shown in FIG. 7. The vortex shedder 238 may extend through the center of the tubular cavity 242, such that the axis 248 intersects the axis 244, as shown in FIG. 6. In some embodiments, both ends of the vortex shedder 238 are attached to the housing 236, as indicated in FIG. 6. Alternatively, the vortex shedder 238 may be secured to the housing 236 at only one of its ends.

The vortex frequency sensor 240 is supported by the housing 236 on a downstream side 254 from the vortex shedder 238 relative to the fluid flow 232, as shown in FIG. 7. In some embodiments, the sensor 240 includes a beam 256 that extends from a wall 258 of the housing 236 into the tubular interior cavity 242, and a piezoelectric transducer 260, which is indicated in phantom lines in FIG. 6. The piezoelectric transducer 260 is used to sense motion of the beam 256 in response to the vortices 250 flowing past the beam 256. Specifically, the beam 256 oscillates in response to the vortices 250 and the piezoelectric transducer 260 produces a sensor signal (e.g., voltage) indicating the oscillatory movement of the beam 256 and, thus, the frequency at which the vortices 250 flow past the beam 256. This vortex frequency may be used to estimate the flow rate of the fluid flow 232, in accordance with conventional techniques.

The vortex flowmeter 230 also includes embodiments of the sensor and test circuits 124, 130 described above. Thus, the vortex flowmeter 230 and the piezoelectric transducer 260 may be operated in a sensing mode using the sensor circuit 124, in accordance with embodiments of the method step 140 described above. For example, when in the sensing mode, the controller 120 estimates the flow rate of the fluid flow 232 based on the vortex frequency that is obtained from the sensor signal output from the piezoelectric transducer 260 (e.g., voltage across the terminals 142 and 144 shown in FIG. 3). The controller 120 may communicate the flow rate to the control unit 110 or another external computing device using the communications circuit 108.

The vortex flowmeter 230 and the piezoelectric transducer 260 may also be operated in a testing mode using the test circuit 130, in accordance with embodiments of the method step 160 described above. When in the testing mode, the test circuit 130 applies the voltage pulse 170 to the piezoelectric transducer 260 (method step 166), which generates the response signal 172 (method step 168), as described above with reference to FIG. 5. The peak positive voltage 186 and the peak negative voltage 188 of the response signal 172 are captured or sampled (method step 184). The controller 120 may calculate a current condition value 208 for the piezoelectric transducer 260 based on the peak positive voltage 186, the peak negative voltage 188 and the pulse voltage 174, as described above (method step 200). The controller 120 may also generate a diagnostic test result 214 based on a comparison of the current condition value 208 and a reference condition value 216 corresponding to a properly operating piezoelectric transducer (method step 212). Finally, the controller 120 may communicate the diagnostic test result 214 to an external computing device, such as the control unit 110, over a process control loop, which may take the form of a physical communication link (e.g., two-wire loop 114) and/or a wireless communication link.

Although the embodiments of the present disclosure have been described with reference to preferred embodiments, workers skilled in the art will recognize that changes may be made in form and detail without departing from the spirit and scope of the present disclosure.

What is claimed is:

1. An industrial process field device for sensing a process variable comprising:
    a piezoelectric transducer;
    a sensor circuit configured to operate the piezoelectric transducer in a sensing mode, in which the sensor circuit generates a sensor signal indicating the process variable based on a voltage across the piezoelectric transducer;
    a test circuit configured to operate the piezoelectric transducer in a testing mode, in which the test circuit:
        applies a voltage pulse having a pulse voltage to the piezoelectric transducer that deforms the piezoelectric transducer and induces a response signal from the piezoelectric transducer;
        captures and stores a peak positive voltage of the response signal; and
        captures and stores a peak negative voltage of the response signal;
    a controller configured to:
        calculate a current condition value of the piezoelectric transducer based on the peak positive voltage, the peak negative voltage and the pulse voltage; and
        generate a diagnostic test result based on a comparison of the current condition value to a reference condition value corresponding to a properly operating piezoelectric transducer; and
    a communications circuit configured to communicate the process variable and the diagnostic test result to an external control unit over a process control loop.

2. The device of claim 1, wherein:
    the peak positive voltage of the response signal corresponds to a rise time of the voltage pulse; and
    the peak negative voltage of the response signal corresponds to a fall time of the voltage pulse.

3. The device of claim 1, wherein the test circuit comprises:
    a pulse generator configured to generate the voltage pulse;
    a reference resistance through which the response signal travels;
    a peak positive voltage detector configured to capture the peak positive voltage across the reference resistance; and
    a peak negative voltage detector configured to capture the peak negative voltage across the reference resistance.

4. The device of claim 3, wherein the current condition value is calculated based on a ratio of the sum of the absolute values of the peak positive and negative voltages and the pulse voltage.

5. The device of claim 4, wherein the testing circuit comprises:
    an inverter configured to invert the peak negative voltage; and
    an adder configured to add the peak positive voltage to the inverted peak negative voltage.

6. The device of claim 4, wherein the diagnostic test result indicates that the condition of the piezoelectric transducer is abnormal when a difference between the current condition value and the reference condition value exceeds a threshold value.

7. The device of claim 6, wherein the threshold value and the reference condition value are stored in a computer-readable medium that is accessible by the controller.

8. The device of claim 3, further comprising a switch configured to transition the device between the sensing and testing modes, wherein:
    the switch couples a first terminal of the piezoelectric transducer to the sensor circuit, and couples a second terminal of the piezoelectric transducer to electrical ground, when in the sensing mode; and
    the switch couples the first terminal of the piezoelectric transducer to the pulse generator, and couples the second terminal of the piezoelectric transducer to the reference resistance, the peak positive voltage detector, and the peak negative voltage detector, when in the testing mode.

9. The device of claim 1, wherein the process variable of the industrial process includes a flow rate of a process medium.

10. A method for testing a condition of a piezoelectric transducer in an industrial process field device, the method comprising:
operating the piezoelectric transducer in a sensing mode using a sensing circuit of the field device comprising generating a sensor signal indicating a process variable based on a voltage across the piezoelectric transducer;
operating the piezoelectric transducer in a testing mode using a test circuit of the field device including:
applying a voltage pulse having a pulse voltage to the piezoelectric transducer that deforms the piezoelectric transducer;
generating a response signal from the piezoelectric transducer in response to the voltage pulse;
capturing and storing a peak positive voltage of the response signal using the test circuit; and
capturing and storing a peak negative voltage of the response signal using the test circuit;
generating a diagnostic test result for the piezoelectric transducer using a controller of the field device comprising:
calculating a current condition value of the piezoelectric transducer based on the peak positive voltage, the peak negative voltage and the pulse voltage; and
generating the diagnostic test result based on a comparison of the current condition value to a reference condition value corresponding to a properly operating piezoelectric transducer; and
communicating the process variable and the diagnostic test result to an external control unit over a process control loop using communications circuitry of the field device.

11. The method of claim 10, wherein:
the peak positive voltage of the response signal corresponds to a rise time of the voltage pulse; and
the peak negative voltage of the response signal corresponds to a fall time of the voltage pulse.

12. The method of claim 10, wherein operating the piezoelectric transducer in a testing mode using a test circuit comprises:
generating the voltage pulse using a pulse generator;
directing the response signal through a reference resistance;
capturing the peak positive voltage across the reference resistance using a peak positive voltage detector; and
capturing the peak negative voltage across the reference resistance using a peak negative voltage detector.

13. The method of claim 12, wherein calculating the current condition value of the piezoelectric transducer comprises calculating the current condition value based on a ratio of the sum of the absolute values of the peak positive and negative voltages and the pulse voltage.

14. The method of claim 13, wherein operating the piezoelectric transducer in a testing mode using a test circuit comprises:
inverting the peak negative voltage using an inverter; and
adding the peak positive voltage to the inverted peak negative voltage using an adder.

15. The method of claim 13, wherein:
generating a diagnostic test result for the piezoelectric transducer using the controller comprises comparing a difference between the current condition value and the reference condition value to a threshold value; and
the diagnostic test result indicates that the condition of the piezoelectric transducer is abnormal when the difference exceeds the threshold value.

16. The method of claim 15, further comprising obtaining the threshold value and the reference condition value from a computer-readable medium using the controller.

17. The method of claim 12, further comprising switching between the sensor mode and the test mode using a switch comprising:
coupling a first terminal of the piezoelectric transducer to the sensor circuit, and coupling a second terminal of the piezoelectric transducer to electrical ground, when in the sensing mode; and
coupling the first terminal of the piezoelectric transducer to the pulse generator, and coupling the second terminal of the piezoelectric transducer to the reference resistance, the peak positive voltage detector, and the peak negative voltage detector, when in the testing mode.

18. The method of claim 10, wherein the process variable comprises a flow rate of a process medium.

19. A vortex flowmeter configured to measure a flow rate of a fluid flow comprising:
a housing including a tubular interior cavity;
a vortex shedder supported by the housing and extending into the tubular interior cavity;
a vortex frequency sensor supported by the housing on a downstream side of the vortex shedder relative to the fluid flow and comprising:
a beam extending from a wall of the tubular interior cavity configured to oscillate in response to vortices shed by the vortex shedder; and
a piezoelectric transducer;
a sensor circuit configured to operate the piezoelectric transducer in a sensing mode, in which the sensor circuit generates a sensor signal indicating a frequency of oscillatory movement of the beam based on a voltage across the piezoelectric transducer;
a test circuit configured to operate the piezoelectric transducer in a testing mode, in which the test circuit:
applies a voltage pulse having a pulse voltage to the piezoelectric transducer that deforms the piezoelectric transducer and induces a response signal from the piezoelectric transducer;
captures and stores a peak positive voltage of the response signal; and
captures and stores a peak negative voltage of the response signal;
a controller configured to:
calculate a flow rate of the fluid flow based on the sensor signal;
calculate a current condition value of the piezoelectric transducer based on the peak positive voltage, the peak negative voltage and the pulse voltage; and
generate a diagnostic test result based on a comparison of the current condition value to a reference condition value corresponding to a properly operating piezoelectric transducer; and
a communications circuit configured to communicate the flow rate and the diagnostic test result to an external control unit over a process control loop.

20. The vortex flowmeter of claim 19, wherein:
the test circuit comprises:
a pulse generator configured to generate the voltage pulse;

a reference resistance through which the response signal travels;
a peak positive voltage detector configured to capture the peak positive voltage across the reference resistance;
a peak negative voltage detector configured to capture the peak negative voltage across the reference resistance;
the current condition value is calculated based on a ratio of the sum of the absolute values of the peak positive and negative voltages and the pulse voltage; and
the diagnostic test result indicates that the condition of the piezoelectric transducer is abnormal when a difference between the current condition value and the reference condition value exceeds a threshold value.

* * * * *